United States Patent
Yamaguchi et al.

(10) Patent No.: US 12,299,071 B2
(45) Date of Patent: May 13, 2025

(54) INFORMATION PROCESSING APPARATUS, INFORMATION PROCESSING METHOD, AND NON-TRANSITORY STORAGE MEDIUM

(71) Applicant: KABUSHIKI KAISHA TOSHIBA, Tokyo (JP)

(72) Inventors: Akihiro Yamaguchi, Kita Tokyo (JP); Ken Ueno, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 919 days.

(21) Appl. No.: 17/447,012

(22) Filed: Sep. 7, 2021

(65) Prior Publication Data

US 2022/0245379 A1  Aug. 4, 2022

(30) Foreign Application Priority Data

Feb. 2, 2021 (JP) .................... 2021-015272

(51) Int. Cl.
G06F 18/214 (2023.01)

(52) U.S. Cl.
CPC ........ G06F 18/214 (2023.01); *G06F 2218/02* (2023.01); *G06F 2218/10* (2023.01); *G06F 2218/20* (2023.01)

(58) Field of Classification Search
CPC .............. G06F 18/214; G06F 2218/02; G06F 2218/10; G06F 2218/20; G06F 18/00; G06F 2218/12
See application file for complete search history.

(56) References Cited

U.S. PATENT DOCUMENTS 11,004,002 B2   5/2021   Mizoguchi
2009/0247895 A1  10/2009  Morikawa et al.
(Continued)

FOREIGN PATENT DOCUMENTS

JP   2015-5093 A    1/2015
JP   2017-138929 A  8/2017
(Continued)

OTHER PUBLICATIONS

Japan Patent Office, Decision to Grant a Patent in JP App. No. 2021-015272, 1 page, and machine translation, 3 pages (May 10, 2024).
(Continued)

*Primary Examiner* — Manuel A Rivera Vargas
(74) *Attorney, Agent, or Firm* — Finnegan, Henderson, Farabow, Garrett & Dunner, LLP

(57) ABSTRACT

One embodiment of the present provides an apparatus and the like that uses a model that estimates shapelet deformation which is according to variations in an anticipated factor, and thereby suppresses a drop in classification performance even if the circumstances of the anticipated factor are different between training and testing. An information processing apparatus according to one embodiment of the present invention is provided with an adjuster and a feature calculator. The adjuster adjusts the shape of a reference waveform pattern corresponding to time series data and used to classify the time series data, on the basis of the value of a factor parameter corresponding to the time series data. The feature calculator calculates a feature of a waveform of the time series data on a basis of the shape of the reference waveform pattern after the adjustment.

15 Claims, 10 Drawing Sheets

(56) References Cited

U.S. PATENT DOCUMENTS

| | | | |
|---|---|---|---|
| 2017/0227584 A1 | 8/2017 | Suehiro et al. | |
| 2018/0349320 A1* | 12/2018 | Yamaguchi | G06N 20/00 |
| 2020/0166552 A1* | 5/2020 | Saneyoshi | G01R 19/2513 |
| 2020/0311576 A1 | 10/2020 | Yamaguchi et al. | |

FOREIGN PATENT DOCUMENTS

| | | |
|---|---|---|
| JP | 2018-205994 A | 12/2018 |
| JP | 6631540 B2 | 1/2020 |
| JP | 2020-170214 A | 10/2020 |
| WO | WO 2008/059878 A1 | 5/2008 |

OTHER PUBLICATIONS

Ziqiang Cheng et al., "Time2Graph: Revisiting Time Series Modeling with Dynamic Shapelets," Proc. of AAAI Conf. on Artificial Intelligence, vol. 34, No. 4, pp. 3617-3624 (2020).

Zicheng Fang et al., "Efficient Learning Interpretable Shapelets for Accurate Time Series Classification," IEEE 34th Int'l Conf. on Data Engineering (ICDE), pp. 497-508 (2019).

Takaaki Tsujimoto et al., "On the Selection of Appropriate Distance Measure for Timeseries Classification using Local Shapelet," Information Processing Society of Japan SIG Technical Report, Bioinformatics (BIO), vol. 2012, No. 32, pp. 1-6 (2012).

Josif Grabocka et al., "Learning Time-Series Shapelets," Proc. of the 20th ACM SIGKDD Int'l Conf. on Knowledge Discovery and Data Mining (KDD), 10 pages (2014).

Yan Zhu et al., "Matrix Profile VII: Time Series Chains: A New Primitive for Time Series Data Mining," Proc. of the Int'l Conf. on Data Mining (ICDM), pp. 695-704 (2017).

\* cited by examiner

VALUE OF FACTOR PARAMETER: 4

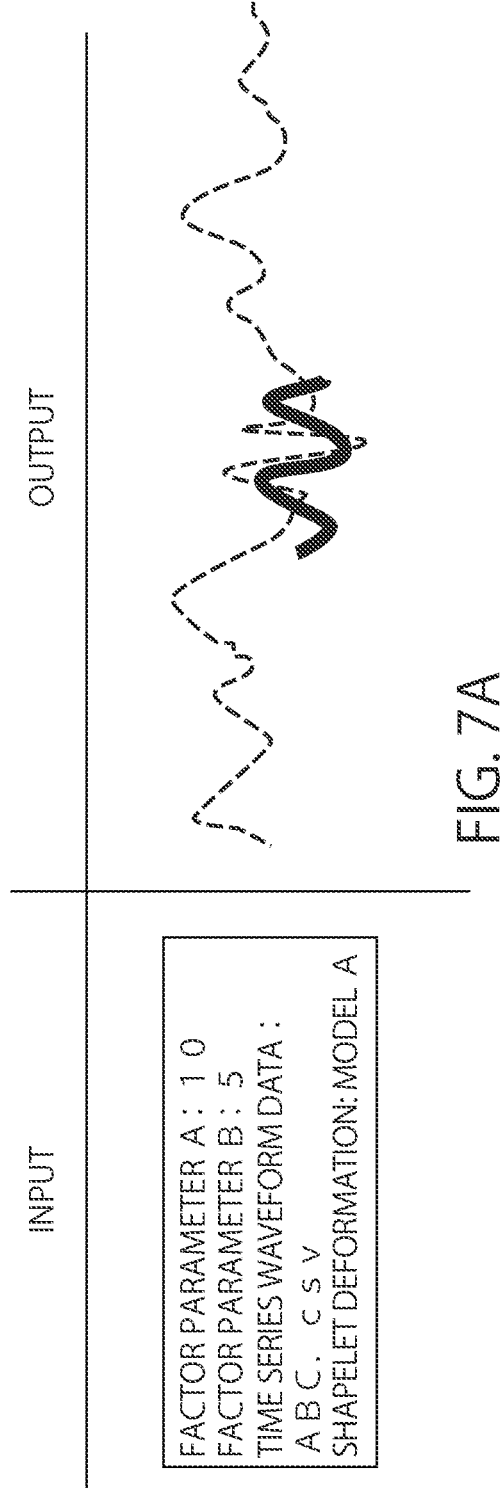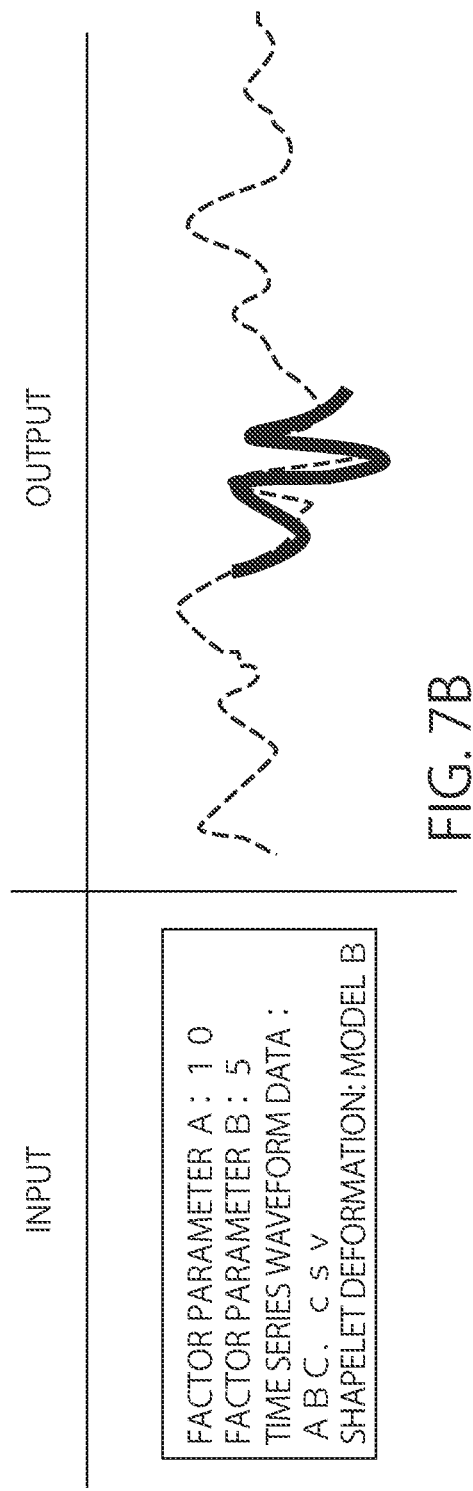

//]: #

INFORMATION PROCESSING APPARATUS, INFORMATION PROCESSING METHOD, AND NON-TRANSITORY STORAGE MEDIUM

CROSS-REFERENCE TO RELATED APPLICATION (S)

This application is based upon and claims the benefit of priority from Japanese Patent Application No. 2021-015272, filed Feb. 2, 2021; the entire contents of which are incorporated herein by reference.

FIELD

Embodiments described herein relate generally to an information processing apparatus, an information processing method, and a non-transitory storage medium.

BACKGROUND

In the case of classifying an analysis result based on time series data into a plurality of classes (classification categories), it is preferable to clarify the basis of classification in addition to having high classification performance. Recently, a shapelet training method capable of clarifying the basis of classification has been proposed as a technology for classifying time series data into classes, and is receiving attention in fields such as data mining and machine learning. The shapelet training method trains a classifier as well as waveform patterns that serve as the basis of classification. The waveform patterns are also referred to as shapelets.

On the other hand, the waveforms of time series waveform data in the same class may deform depending on factors such as changes of environment. For example, a shapelet indicating the normal state of a breaker in an electrical substation is known to deform in response to temperature changes near the breaker. For example, the shapes of the corresponding shapelets are different between time series waveform data measured for equipment in a normal state when the surrounding environment is 20° C. and time series waveform data measured for equipment in a normal state when the surrounding environment is −20° C. Consequently, if shapelets and the classifier are trained without considering factors that would cause the waveforms to deform, such as temperature, pressure, age, and season, the problem of lowered classification performance occurs.

BRIEF DESCRIPTION OF THE DRAWINGS

FIGS. 7A and 7B are diagrams illustrating a second example of output;

DETAILED DESCRIPTION

One embodiment of the present provides an apparatus and the like that uses a model that estimates shapelet deformation which is according to variations in an anticipated factor, and thereby suppresses a drop in classification performance even if the circumstances of the anticipated factor are different between training and testing.

An information processing apparatus according to one embodiment of the present invention is provided with an adjuster and a feature calculator. The adjuster adjusts the shape of a reference waveform pattern corresponding to time series data and used to classify the time series data, on the basis of the value of a factor parameter corresponding to the time series data. The feature calculator calculates a feature of the waveform of the time series data on the basis of the shape of the reference waveform pattern after the adjustment.

An embodiment will be explained in detail below with reference to the accompanying drawings. The present invention is not limited to the embodiment.

Embodiment of Present Invention

Figure 1:
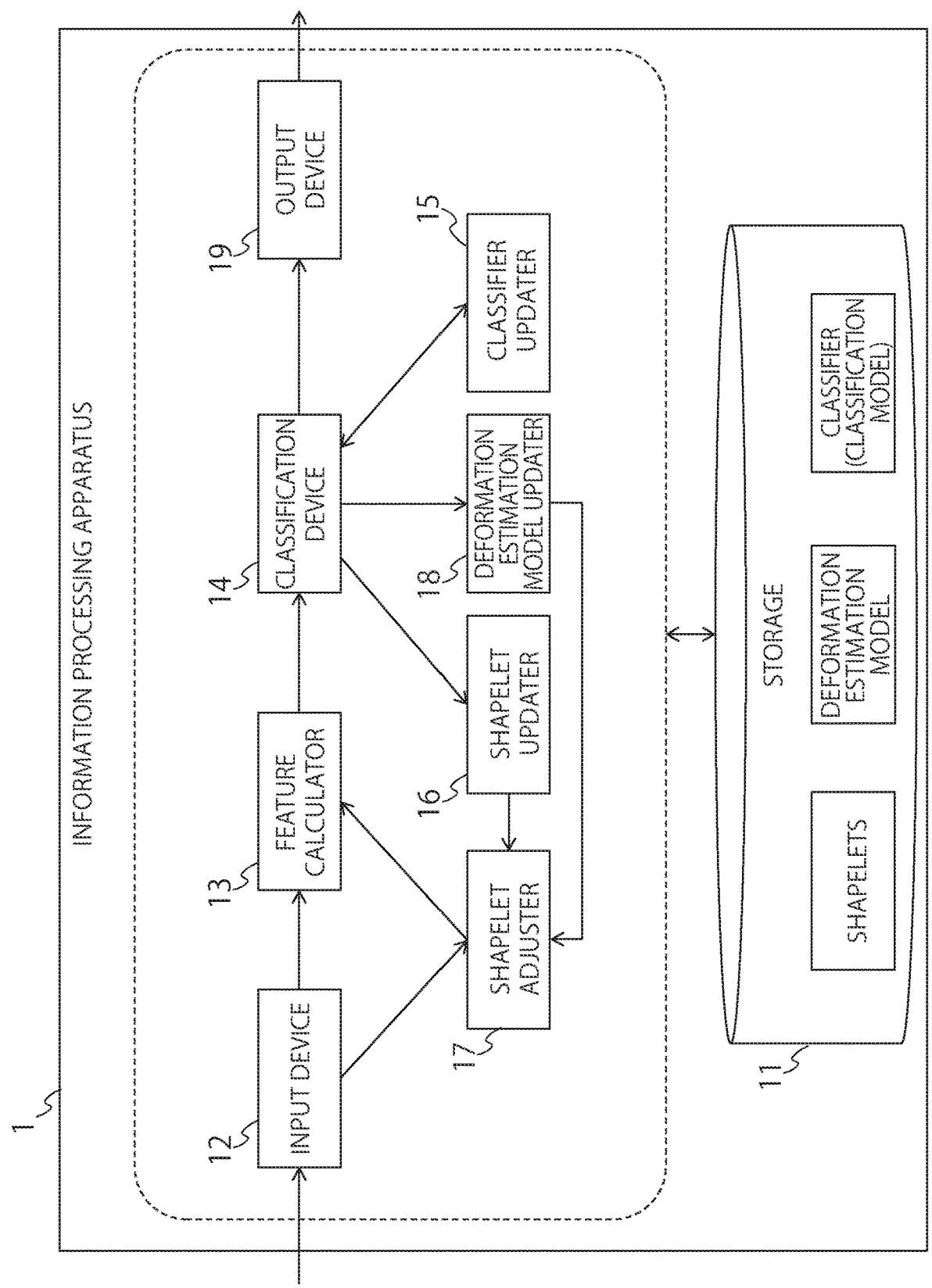
FIG. 1 is a block diagram illustrating one example of an information processing apparatus according to an embodiment of the present invention.

FIG. 1 is a block diagram illustrating one example of an information processing apparatus according to an embodiment of the present invention. An information processing apparatus 1 according to the present embodiment is provided with storage 11, an input device 12, a feature calculator 13, a classification device 14, a classifier updater 15, a shapelet updater 16, a shapelet adjuster 17, a deformation estimation model updater 18, and an output device 19.

The information processing apparatus 1 selects, on the basis of time series data, a class corresponding to the time series data from among a plurality of classes (classification categories). A classifier (classification model) is used to make the selection. For example, on the basis of time series data expressing daily measured values of a sensor installed to monitor equipment, the classifier selects a class related to a state of the equipment, such as normal or abnormal.

In the present embodiment, the classifier is also assumed to be generated. Note that generating the classifier means repeatedly training a classifier using a plurality of time series data to cause a parameter value of the classifier to approach an appropriate value. Therefore, the information processing apparatus 1 may also be referred to as a training apparatus.

The content expressed by the time series data is not particularly limited. However, since the content expressed by the time series data inputted into a single classifier is the same and in the case where it is desirable to use time series data expressing different content, it is necessary to use a different classifier. For example, time series data expressing measurement results from a humidity sensor cannot be classified accurately if inputted into a classifier that performs classification on the basis of time series data expressing measurement results from a temperature sensor. Consequently, it is necessary to prepare a different classifier in the case of wanting to perform classification on the basis of time series data expressing measurement results from a humidity sensor. The following description assumes that the content expressed by the time series data is the same and a single classifier is generated.

Furthermore, the waveform of the time series data is assumed to change depending on variations in some kind of factor. For example, the waveform of the time series data is assumed to deform according to factors such as the temperature, pressure, or age of the equipment to be measured, or the season when the measurement data is measured. In the following, a quantity that may act as a factor causing the waveform of the time series data to deform is referred to as a "factor parameter". In other words, if the value of the factor parameter varies, the waveform of the time series data also deforms.

In addition, the number and content of the classes is not particularly limited. For example, in the case where the information processing apparatus 1 estimates the state of equipment, the classes may be determined as "normal", "abnormal", "caution", "failure", and the like. In the case where the information processing apparatus 1 predicts a future state such as the weather, the classes may be determined as "sunny", "clear", "cloudy", "rainy", and the like.

Additionally, the information processing apparatus 1 also generates shapelets, which are partial waveform patterns effective for classification and expressed as the basis of classification results. Like the classifier, shapelets are different depending on the content expressed by the time series data. For example, a shapelet corresponding to time series data expressing measurement results from a temperature sensor and a shapelet corresponding to time series data expressing measurement results from a humidity sensor obviously have different shapes. A shapelet may also be considered to be a waveform that serves as a reference for classifying classes, and therefore is also referred to as a reference waveform pattern.

Figure 2:
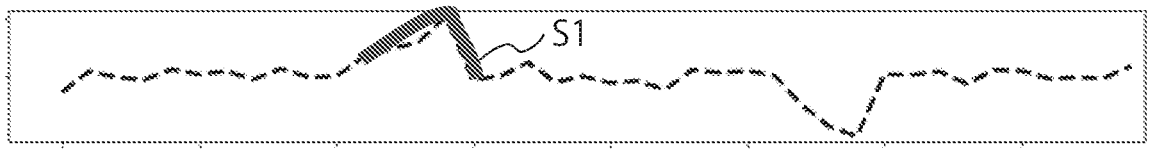
FIG. 2 is a diagram for explaining a shapelet.

FIG. 2 is a diagram for explaining a shapelet. In FIG. 2, the waveform of the time series data is indicated by the dashed line. Also, a shapelet S1 corresponding to the time series data is illustrated. A class is determined by comparing the waveform of time series data with a shapelet like in FIG. 2. In the example of FIG. 2, a portion of the time series data and the shapelet are highly similar, and consequently a class corresponding to the case of high similarity is selected. Note that a class may also be selected on the basis of dissimilarity rather than similarity in some cases.

In this way, the information processing apparatus 1 classifies time series data on the basis of the time series data and a reference waveform pattern corresponding to the time series data. The same training as for the classifier is also used to make shapelets approach an appropriate shape corresponding to the time series data to be classified. Furthermore, as described above, because the waveform of the time series data changes in response to variations in some kind of factor, it is also necessary to adjust the shapes of shapelets according to the factor.

Figure 3:
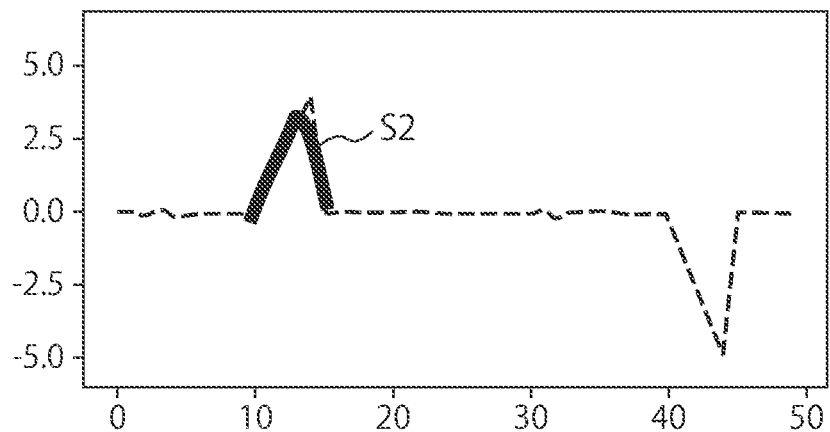
FIG. 3 is a first diagram for explaining time series data and shapelet deformation.
Figure 4:
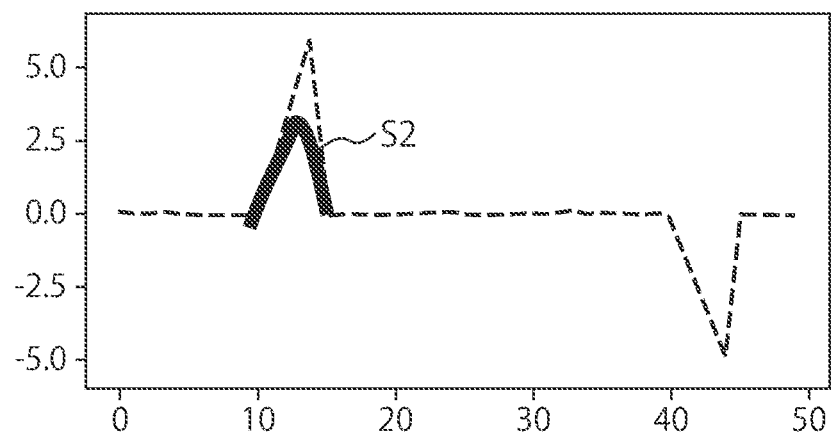
FIG. 4 is a second diagram for explaining time series data and shapelet deformation.
Figure 5:
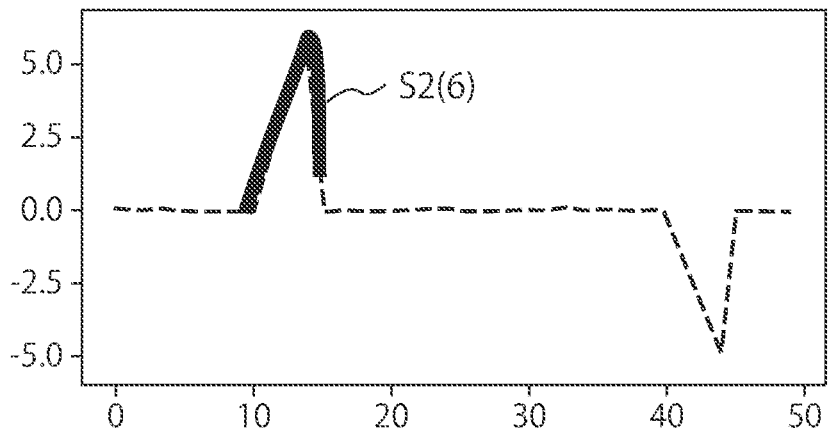
FIG. 5 is a third diagram for explaining time series data and shapelet deformation.

FIGS. 3 to 5 are diagrams for explaining time series data and shapelet deformation. FIG. 3 illustrates time series data when the value of a certain factor parameter is "4", FIGS. 4 and 5 illustrate time series data when the value of a certain factor parameter is "6". Note that the time series data illustrated in FIGS. 3 to 5 are all assumed to be classified into the same class of "normal".

FIG. 3 illustrates a shapelet S2 corresponding to the time series data in FIG. 3. Here, assume that the class is determined to be "normal" in the case where the time series data includes a portion resembling the shapelet S2. Therefore, the class is determined to be normal in the example of FIG. 3.

On the other hand, in FIG. 4, the value of the factor parameter has increased, causing the magnitude of an extremum in the time series data in FIG. 4 to be greater than the time series data illustrated in FIG. 3. Consequently, there is an increased possibility that the time series data in FIG. 4 will not be determined to include a portion resembling the shapelet S2. In other words, there is an increased possibility that the class will not be determined to be normal, and the classification accuracy will be reduced.

Accordingly, as illustrated in FIG. 5, the shape of the shapelet deforms according to the value of the factor parameter. FIG. 5 illustrates a shapelet S2(6) for the case where the value of the factor parameter is "6". The "(6)" portion of the sign denotes the value of the corresponding factor parameter. As FIG. 5 demonstrates, the time series data in FIG. 5 includes a portion resembling the shapelet S2(6), and therefore is determined to be normal. In this way, the information processing apparatus 1 adjusts the shape of the shapelet corresponding to the time series data from a shape that does not correspond to the value of the factor parameter to a shape that also corresponds to the value of the factor parameter. With this arrangement, even if the waveform of the time series data deforms according to the value of the factor parameter, the shape of the shapelet used for classification deforms similarly, thereby suppressing a drop in classification accuracy.

The shape of the shapelet is adjusted on the basis of a deformation estimation model. The deformation estimation model is anticipated to be a regression model that accepts the value of the factor parameter as input, and outputs a deformation amount from a specific shape of the shapelet. The regression model is not particularly limited and may be a linear regression model, a locally 11 near regression model, a nonlinear ridge regression model, or the like, Specifically, the deformation amount is expressed as a vector indicating the distance that each plot forming the shapelet has moved due to the adjustment. Thereafter, the specific shape of the shapelet and the deformation amount are combined to generate a shapelet corresponding to the value of the parameter factor inputted into the deformation estimation model. In terms of the example from FIGS. 3 to 5, if information indicating 6 as the value of the factor parameter is inputted into the deformation estimation model, the deformation estimation model outputs the deformation amount from the shapelet S2, and the deformation amount is combined with the shapelet S2 to generate the shapelet S2(6). The output accuracy of the deformation estimation model is also improved through training.

Note that it is also possible to generate shapelets by learning a shapelet for each value of the factor parameter, without using a deformation estimation model. However, this is unrealistic in the case where the factor parameter may take various values. For example, suppose that training is performed by preparing a large amount of time series data for which the value of the factor parameter is 4 to generate a shapelet S2(4) corresponding to the time series data for which the value of the factor parameter is 4, and training is performed by preparing a large amount of time series data for which the value of the factor parameter is 6 to generate a shapelet S2(6) corresponding to the time series data for which the value of the factor parameter is 6. In this case, it is possible highly accurately classify time series data for which the value of the factor parameter is 4 and time series data for which the value of the factor parameter is 6. However, time series data for which the factor parameter takes another value cannot be classified accurately. Therefore, it is anticipated that the factor parameter may take various values, and a deformation estimation model based on a regression model capable of accommodating such a factor parameter is used.

Also, to calculate a deformed shapelet, it is necessary to determine a specific shapelet to serve as the reference for the deformation amount. For example, a single value of the factor parameter may be determined, and the shapelet corresponding to time series data for the determined value may be obtained by learning. A plurality of values of the factor parameter may also be determined, respective shapelets corresponding to time series data for each of the plurality of determined values may be obtained, and the specific shapelet may be determined on the basis of a property such as the average or the center of gravity of the obtained shapelets. Hereinafter, the specific shapelet that serves as the reference when calculating the deformation amount is referred to as the "reference shapelet". In the present embodiment, the average of respective shapelets for each of a plurality of values of the factor parameter is treated as the reference shapelet.

In this way, the information processing apparatus 1 generates a classifier that determines a class expressed by the time series data, a reference shapelet of the time series data, and a deformation estimation model that estimates the deformation amount from the reference shapelet according to the factor parameter.

The symbols related to the time series data and the like used herein will be described. In the present embodiment, the time series data used for training is denoted "T". Also, the "i"-th time series data (where "i" is an integer equal to or greater than 1) is denoted "$T_i$". Let "I" be the total number of pieces of time series data "T". Consequently, the last piece of time series data is denoted "$T_I$". Also, the length of the period expressed by each piece of time series data, or in other words, the number of plots included in each piece of time series data, is taken to be the same, and the length is denoted "Q". Note that the time series data is assumed not to have any missing portions. The time series data is denoted by a matrix "I×Q".

Also, the factor parameter with respect to the "i"-th time series data "$T_i$" is denoted "$V_i$". Note that "$V_i$" may be a scalar containing a single value, or a vector containing a plurality of values. In this description, the factor parameter "$V_i$" is taken to be an N-dimensional vector (where "N" is an integer equal to or greater than 1). Since "I" is the total number of pieces of time series data "T" and the factor parameter "$V_i$" corresponding to a single piece of time series data "$T_i$" is an N-dimensional vector, the factor parameter corresponding to the time series data "T" used for training is expressed as a matrix indicating real values in "I×N" dimensions.

The reference shapelet is denoted "S". As described above, in the present embodiment, the average of the respective shapelets corresponding to the time series data for each of a plurality of values of the factor parameter is treated as the reference shapelet, and the number of the plurality of values of the factor parameter is taken to be "K". The length of each shapelet, that is, the number of plots included in each shapelet, is taken to be L in common for all shapelets. Therefore, the reference shapelet is expressed by the matrix "K×L".

A parameter of the classifier is denoted "W". Note that the parameter "W" is a vector, and the number of elements in the parameter "W" is taken to be "K", the same as the number of shapelets for generating the reference shapelet "S". In other words, the parameter "W" is a K-dimensional vector. Note that a bias term of the parameter "W" may be set appropriately, and is omitted here.

A parameter of the deformation estimation model is denoted "α". The parameter "α" depends on the type of deformation estimation model, and assuming that the deformation estimation model is a linear regression model with the bias term omitted, the parameter "α" is expressed by a tensor of "K×L×N" dimensions.

An internal configuration of the information processing apparatus 1 will be described. Note that the components illustrated in FIG. 1 are for performing the above processes, and other components are omitted here. Furthermore, the components may also be subdivided further, or combined with each other. For example, the storage 11 may be subdivided according to the files to be saved or the like. Also, the components other than the storage 11 may be considered to be operators. Moreover, a processing result from each component may be sent to the component that performs the next process, or the processing result may be stored in the storage 11 and the component that performs the next process may access the storage 11 to acquire the processing result.

The storage 11 stores data to be used in the processes by the information processing apparatus 1. For example, the storage 11 stores data such as the classifier, the shapelets, and the deformation estimation model, either in training or already trained. Additionally, set values such as the number and length of the shapelets are stored. For example, a default value of 10 may be stored as the number "K" of the shapelets, and a default value of "Q×0.1" may be stored as the length "L" of the shapelets. Information such as a processing result from each component of the information processing apparatus 1 may also be stored.

The input device 12 acquires data from an external source. For example, the input device 12 acquires data to be used for training and data to be used for testing. Hereinafter, the data to be used for training will be referred to as the "training dataset", and the data to be used for testing will be referred to as the "testing dataset".

The training dataset at least includes time series data to be used for training, a correct class into which the time series data should be classified, and a value of the factor parameter corresponding to the time series data. Note that the value of the factor parameter included in the training dataset is assumed to be one of the "K" predetermined values for generating the reference shapelet. However, each of the "K" values may be determined appropriately. For example, the values may be spaced at fixed intervals like an arithmetic progression, or the values may be determined randomly.

The testing dataset at least includes time series data to be used for testing and a value of the factor parameter corresponding to the time series data. Unlike the training dataset, the value of the factor parameter included in the testing dataset is unrestricted.

Note that set values to be used by processes, such as the number "K" and length "L" of the shapelets, may also be inputted. In the case where set values are inputted, the inputted set values are used instead of the set values (default values) stored in the storage 11.

Note that in the case where there are multiple types of deformation estimation models, such as a linear regression model, a locally linear regression model, and a nonlinear ridge regression model, a specification of the type of deformation estimation model may also be acquired. In the case where a specification is not acquired, it is sufficient to use a deformation estimation model (default deformation estimation model) that is expected to be used by the initial setting.

On the basis of a shapelet and time series data, the feature calculator 13 calculates a feature indicating the relationship between the shapelet and the time series data. During training, the feature calculator 13 calculates the feature by selecting and using the shapelet corresponding to the value of the factor parameter of the training time series data from among the "K" shapelets being trained to generate the reference shapelet, Note that the shapelet is updated by the shapelet updater 16 described later. Also, during testing, the feature calculator 13 calculates the feature by using the shapelet corresponding to the value of the factor parameter of the testing time series data and generated using the deformation amount from the deformation estimation model. Note that the shapelet is generated by the shapelet adjuster 17 described later.

Note that in the case where the shapelet corresponding to the value of the factor parameter of the testing time series data is generated by the shapelet updater 16, during testing, the feature calculator 13 may also calculate the feature by using the shapelet generated by the shapelet updater 16. For example, suppose that during training, a shapelet S2(4) for which the value of the factor parameter is 4 and a shapelet S2(6) corresponding to the time series data for which the value of the factor parameter is 6 have been generated. In this case, during testing, when calculating the feature of the time series data for which the value of the factor parameter is 4.5, it is necessary to use the deformation estimation model to generate a shapelet S2(4.5). However, in this case, during testing, when calculating the feature of the time series data for which the value of the factor parameter is 6, it is sufficient to use the shapelet S2(6) already generated, without having to use the deformation estimation model to generate the shapelet S2(6). In this way, it is sufficient to adjust shapelets using the deformation estimation model only with respect to shapelets other than the already-generated shapelets. In other words, it is sufficient to use the deformation estimation model to estimate a shapelet that has not been generated, and shapelet deformations can be interpolated and extrapolated by the deformation estimation model.

The feature may be treated as a vector expressing the distance between each plot of the shapelet to be used and each corresponding plot in the time series data. Note that each plot in the time series data corresponding to each plot in the shapelet is determined by moving an offset of the time series data to find the offset for which the total distance between corresponding plots is minimized. Note that the Euclidean distance may be used for the above distance.

The classification device 14 acquires a classification result by inputting the calculated feature into the classifier. The classification result is expressed by a numerical value such as a probability of corresponding to the correct class. For the classifier, a known classifier such as a support vector machine or a neural network model may be used.

During training, the classifier updater 15 updates the value of the parameter "W" of the classifier on the basis of the classification result. Also, during training, the shapelet updater 16 updates the shapelet used to calculate the feature from among the "K" shapelets for generating the reference shapelet, on the basis of the classification result. Through these updates, the classification result is updated to approach the correct class associated with the time series data. For example, the classification result may be updated to minimize the value of a loss function that includes a numerical value such as the probability of corresponding to the correct class as an argument. For example, a gradient may be defined, and gradient descent may be used to update the parameter.

In addition, the shapelet updater 16 may also update a shapelet scheduled to be updated such that the shapelet approaches the waveform of time series data classified into the same class. For example, the shape of the shapelet for classifying data into the "normal" class may be updated to approach a portion of the waveform of time series data that should be classified into the "normal" class. The classifier may also classify data on the grounds of a low similarity between the shape of a shapelet and a portion of the waveform of the time series data, but it is easier for humans to understand the validity of the classification result if classification is indicated as a similarity between the shape of the shapelet and a portion of the waveform of the time series data as illustrated in FIG. 2.

The shapelet adjuster 17 adjusts the reference shapelet used in the classification of time series data on the basis of the value of the factor parameter corresponding to the time series data. Specifically, the value of the factor parameter is inputted into the deformation estimation model, and a deformation amount corresponding to the value is acquired. Thereafter, by adding the calculated deformation amount to the reference shapelet, a shapelet corresponding to the value of the factor parameter is generated. In other words, the shape of the reference shapelet is adjusted from a shape that does not correspond to the value of the factor parameter to a shape that corresponds to the value of the factor parameter.

The deformation estimation model updater 18 updates the parameter included in the deformation estimation model such that the shapelet adjusted by the shapelet adjuster 17, or in other words the shapelet adjusted to a shape corresponding to the factor parameter, approaches the shapelet updated by the shapelet updater 16. For the update method, a method of the related art such as gradient descent may be used, similarly to the classifier. For example, the parameter of the deformation estimation model is updated by treating the difference from a shapelet to be compared as a response variable and treating the factor parameter as an explanatory variable. For example, in the case where the difference and the factor parameter are a linear regression, the least squares method or the like may be used to estimate the parameter of the deformation estimation model.

The output device 19 outputs the processing result of each component. For example, the output device 19 outputs information related to the time series data that has been used, the shape of the shapelet, and the like. Note that the output format of the output device 19 is not particularly limited, and may be a table or an image, for example.

Figure 6A:
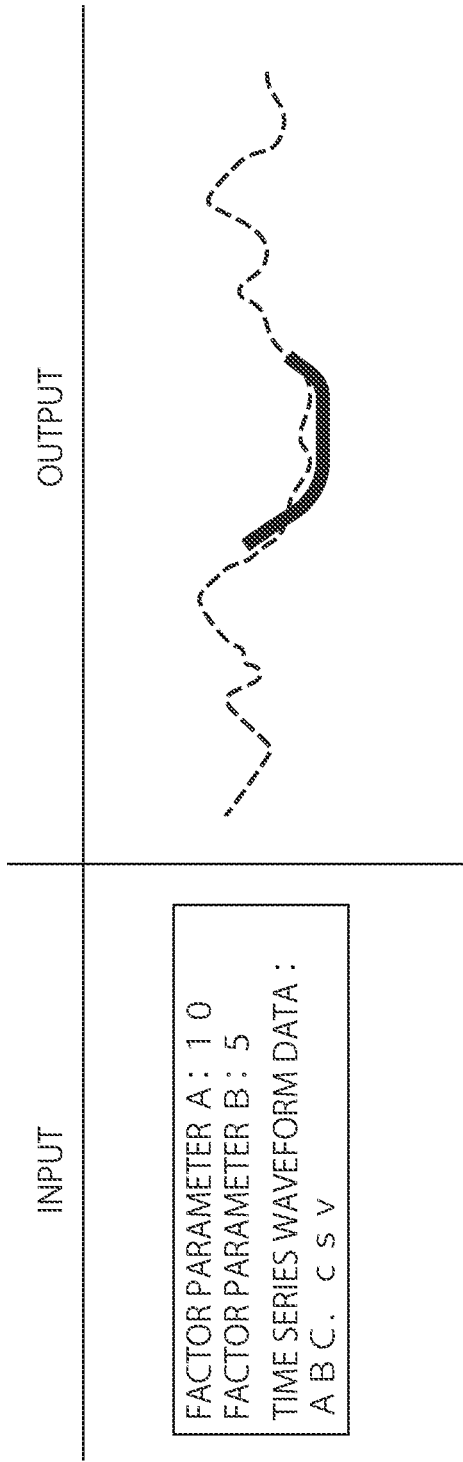
FIGS. 6A and 6B are diagrams Illustrating a first example of output.

FIGS. 6A to 9 illustrate examples of the output. In FIGS. 6A and 6B, the input content is illustrated in the region on the left side labeled "Input", and the output content is illustrated in the region on the right side labeled "Output".

Figure 6B:
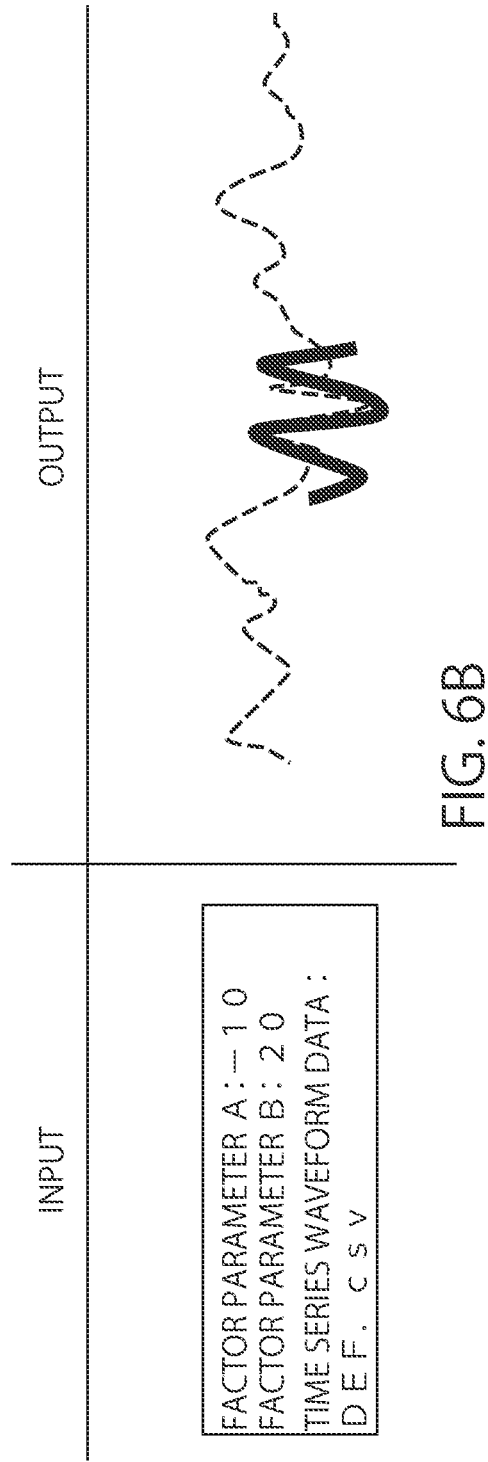

The input content in FIGS. 6A and 6B is the value of "factor parameter A", the value of "factor parameter B", and the file name of time series waveform data to be used. Also, the output content is a dashed-line graph illustrating the time series waveform data specified by the input, and a solid-line graph illustrating the shapelet deformed to match the time series waveform data. As illustrated in FIGS. 6A and 6B, the values of the factor parameters are varied. Consequently, the shapelets illustrated in FIGS. 6A and 6B are generated from the same reference shapelet, but are changed into different shapes according to the inputted values of the factor parameters. In this way, changing the shape of the shapelet according to an anticipated factor makes it possible to suppress a drop in the accuracy of the determination of whether or not a shapelet is included in time series waveform data. Also, by outputting a graph like in FIGS. 6A and 6B, a user of the information processing apparatus 1 is able to recognize the deformation of the shapelet according to the factor parameter.

FIGS. 7A and 7B illustrate an example of a case where the models used to estimate the deformation of a shapelet are different. The input content in FIGS. 7A and 7B is the value of "factor parameter A", the value of "factor parameter B", the file name of tame series waveform data to be used, and the name of the deformation estimation model. Also, the output content in FIGS. 7A and 7B is a graph of the time series waveform data specified by the input and a shapelet that fits the time series waveform data.

In the example of FIGS. 7A and 7B, the same time series waveform data is used, but the deformation estimation model used is different. For this reason, the shapes of the outputted shapelets are different. For example, the output from each deformation estimation model like in FIGS. 7A and 7B may be checked, and a deformation estimation model corresponding to the factor parameter may be specified. By producing such outputs, it is possible to assist the user of the information processing apparatus 1 with appropriately selecting an effective shapelet for classification.

Figure 8A:
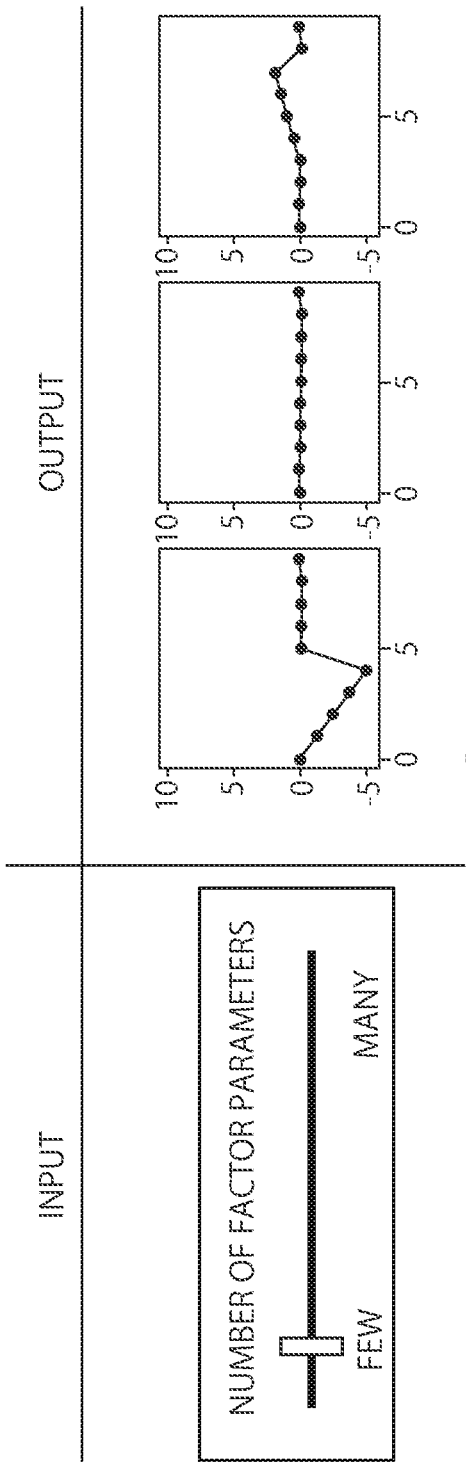
FIGS. 8A and 8B are diagrams illustrating a third example of output.
Figure 8B:
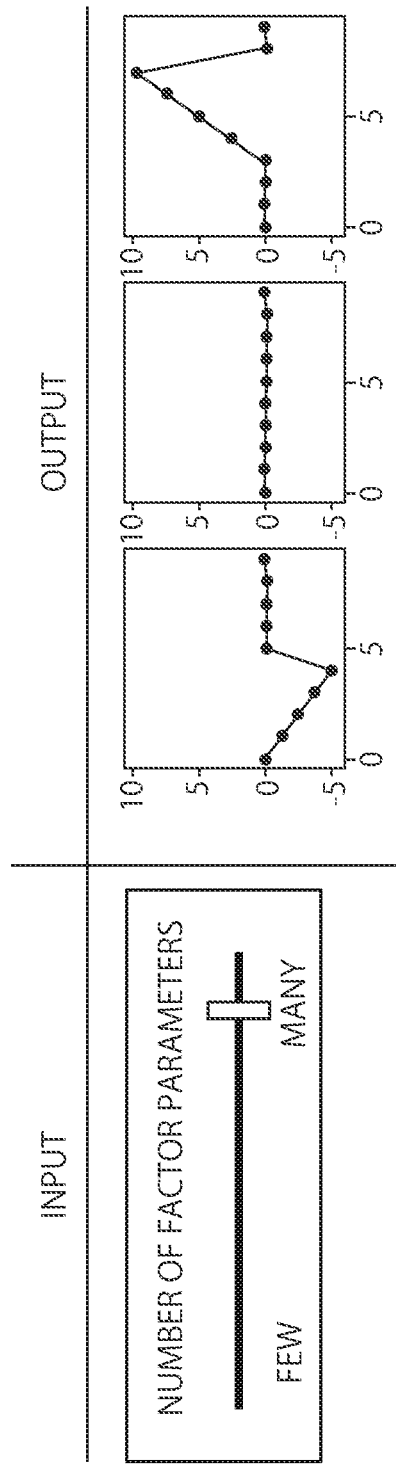

FIGS. 8A and 8B illustrate an example of the case of adjusting the number of factor parameters. The input content in FIGS. 8A and 8B is the number of factor parameters to be considered. The example of FIGS. 8A and 8B illustrates that the number of factor parameters is adjustable by a slider bar or the like, and by changing from the state of the input illustrated in FIG. 8A to the state of the input illustrated in FIG. 8B, the number of factor parameters to be considered is increased. In the case of increasing or decreasing the number of factor parameters in this way, the deformation estimation model to be used is changed. Namely, deformation estimation models having different numbers of factor parameters are trained in advance, and the deformation estimation model to be used changes according to the specified number of factor parameters. Note that the factor parameters to be used may also be specified. In this case, the specified factor parameters may also be accounted for, and a deformation estimation model having the same number of factor parameters to be considered as the specified number is selected.

Also, the output content in FIGS. 8A and 8B is graphs of shapelets that change depending on the number of factor parameters. In the example of FIGS. 8A and 8B, the graphs of three shapelets are illustrated. The graphs demonstrate that the shapelets on the right side and in the middle are unaffected even if the number of factor parameters changes, but if the number of factor parameters increases, an extremum value in the shapelet on the left side rises.

Output like FIGS. 8A and 8B enables the user of the information processing apparatus 1 to intuitively understand the relationship between the factor parameters and the shapelets. In particular, the deformation of a shapelet may be estimated without having to measure all of the factor parameters during training. With this arrangement, even in cases where collecting a certain value of a factor parameter as actual data is difficult, the user is able to check the deformation of a shapelet with respect to the value.

Figure 9:
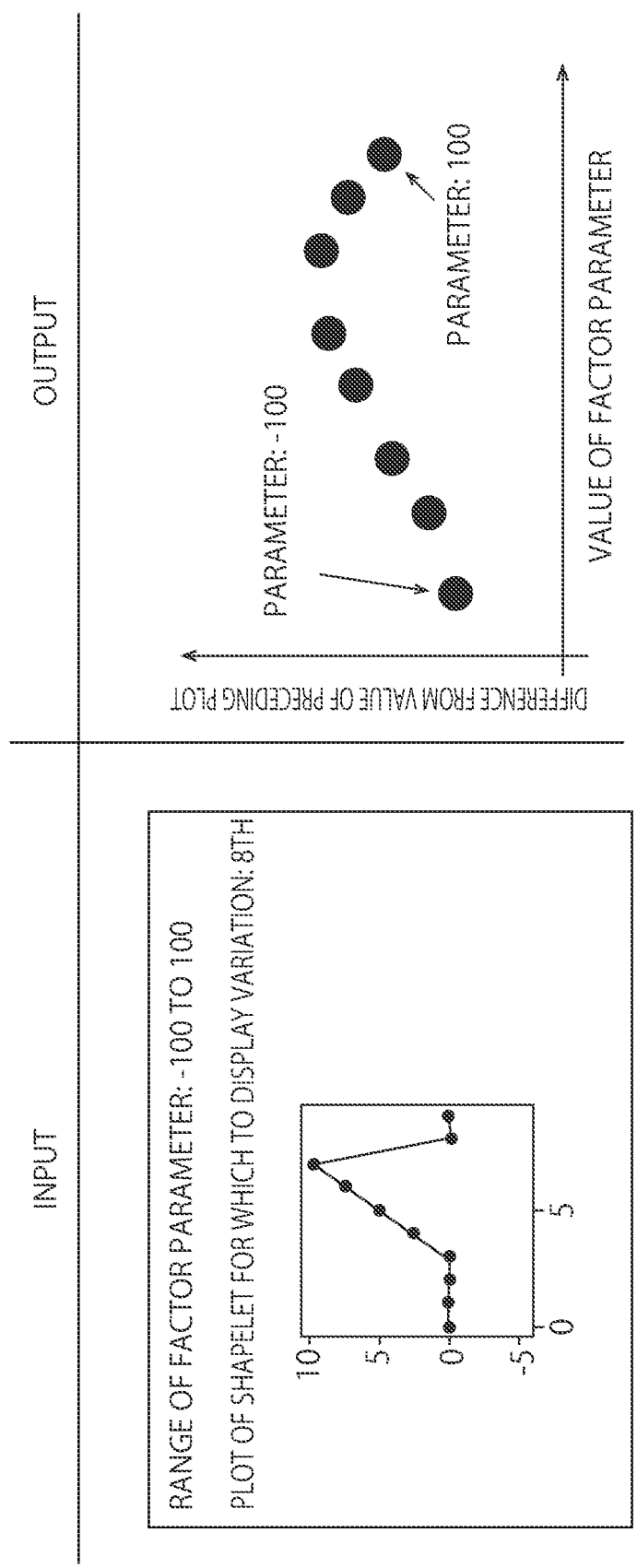
FIG. 9 is a diagram illustrating a fourth example of output.

The example in FIG. 9 illustrates, in a case of receiving a specification of a factor parameter for which the value is to be varied and a plot inside a shapelet, how the specified plot varies in response to variation of the value of the specified factor parameter. In the example of FIG. 9, the value of the specified factor parameter is varied from −100 to +100. In this case, variation of the eighth plot of the shapelet is outputted. The example in FIG. 9 illustrates the variation of the difference between the specified eighth plot and the preceding seventh plot. When the factor parameter is increased from −100, both the seventh plot and the eighth plot vary in response to the increase, but the variation of the eighth plot is larger, and the graph illustrates that the differences between the horizontal values of the plot widen. Moreover, the graph illustrates that the differences do not increase linearly, and also gradually decrease before the value of the factor parameter reaches 100. In this way, the relationship between a specific plot and another plot may be outputted.

Figure 10:
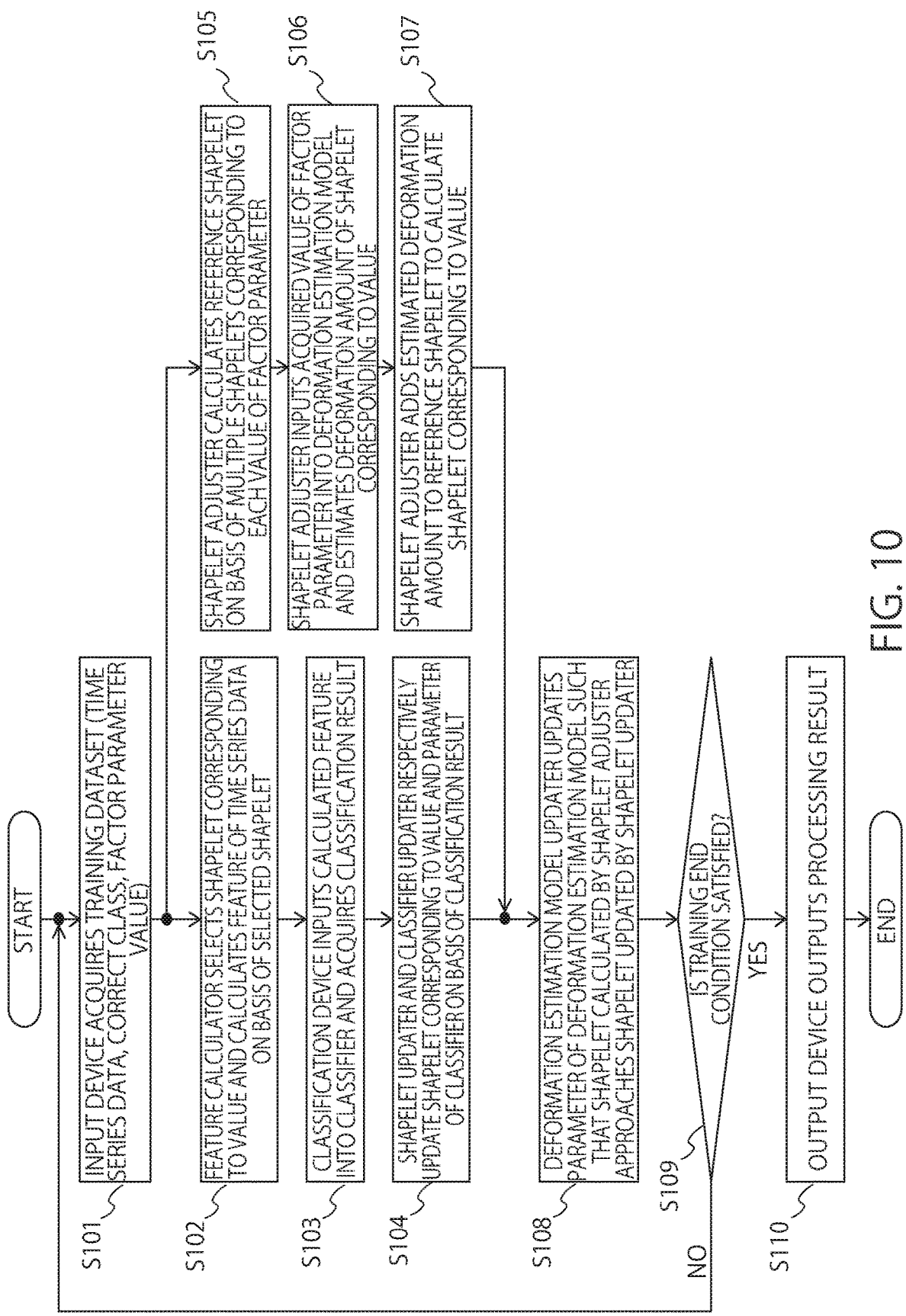
FIG. 10 is a schematic flowchart of a training process.

Next, the flow of each process by the components will be described. FIG. 10 is a schematic flowchart of a training process. In the flowchart, the shapelets, the classifier, and the deformation estimation model are trained.

Note that the training targets are assumed to be in an initial state when the flow starts. Note that training targets in an initial state stored in the storage 11 may be used, or the training targets may be initialized at the same time as starting the flow. For example, in the initial state of the parameter "W" of the classifier, all elements are set to 0. To initialize the shapelets with consideration for deformation with respect to factor parameters, segments of length L are extracted from the time series dataset for each factor parameter and clustered according to a method such as k-means clustering. With this arrangement, the centroid of "K" clusters for each factor parameter is treated as a shapelet with consideration for deformation by the factor parameter. The parameter "α" is initialized as a tensor with all elements set to 0 in the case of a linear deformation estimation model, for example.

The input device 12 acquires the training dataset (S101). As described above, the training dataset includes time series data, the correct class of the time series data, and a value of the factor parameter corresponding to the time series data. Also, the value is not any value, but rather is taken to be one of the "K" predetermined values.

The feature calculator 13 selects the shapelet corresponding to the value of the factor parameter from among the "K" shapelets stored in the storage 11, and generates a feature vector on the basis of the selected shapelet and the time series data (S102). The "K" shapelets stored in the storage 11 are stored in the storage 11 in advance and updated by the process in S108 described later. In other words, the feature during training is not based on the shapelet adjusted by the shapelet adjuster 17, but rather is based on the shapelet updated by the shapelet updater 16 and the waveform of the time series data.

The classification device 14 inputs the calculated feature into the classifier and acquires a classification result (S103). The classifier updater 15 and the shapelet updater 16 update the selected shapelet and the parameter of the classifier such that the classification result approaches the correct class (S104).

On the other hand, before the selected shapelet is updated, the shapelet adjuster 17 calculates a reference shapelet on the basis of a plurality of shapelets corresponding to each value of the factor parameter (S105). The shapelet adjuster 17 inputs the acquired value of the factor parameter into the deformation estimation model and estimates the deformation amount of the shapelet corresponding to the value (S106). The shapelet adjuster 17 adds the estimated deformation amount to the reference shapelet to calculate a shapelet corresponding to the value (S107).

The deformation estimation model updater 18 updates the parameter of the deformation estimation model such that the shapelet calculated by the shapelet adjuster 17 approaches the shapelet updated by the shapelet updater 16 (S108). This is because the shapelet updated by the shapelet updater 16 is newer than the shapelet calculated by the shapelet adjuster 17, and therefore is considered to be close to the appropriate shape. With this arrangement, the parameter of the deformation estimation model also approaches an appropriate value.

Additionally, it is determined whether a training end condition is satisfied, and if the training end condition is not satisfied (S109, No), the flow returns to the process in S101, and training is performed again on the basis of the next training time series data. The processes from S101 to S108 constitute one iteration of training. When the training end condition is satisfied (S109, Yes), training ends, the output device 19 outputs information such as the shape of the generated shapelet (S110), and the flow ends.

The training end condition may be defined appropriately. For example, training may be configured to end when the number of iterations reaches an upper limit value, Training may also be configured to end when the value of an objective function exceeds a predetermined threshold.

Note that the flowchart in this description is merely an example, and the flow is not limited to the example described. Steps in the flow may also be reordered, added, or skipped depending on properties such as specifications or changes demanded by the embodiment. For example, the processing result from each component may be successively stored in the storage 11, and each component may acquire the processing results of other components needed for processing from the storage 11. Additionally, the output of the output device 19 does not have to be executed when training ends, and may also be outputted when an output instruction is received.

Figure 11:
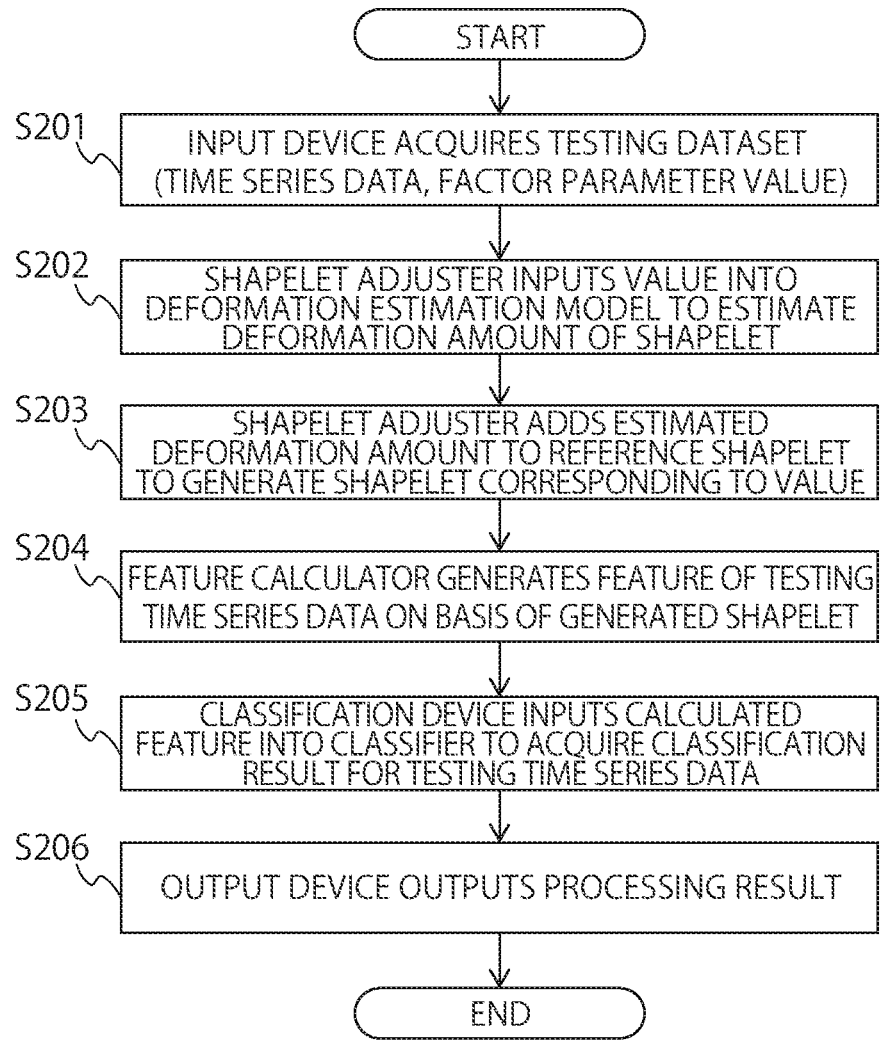
FIG. 11 is a schematic flowchart of a classification process.

FIG. 11 is a schematic flowchart of a classification process. The flowchart is executed after the training of the classifier and the like is completed.

The input device 12 acquires the testing dataset (S201). As described above, the testing dataset includes time series data and a value of the factor parameter corresponding to the time series data. Furthermore, unlike the training dataset, the value may be any value.

The shapelet adjuster 17 inputs the acquired value of the factor parameter into the deformation estimation model to estimate the deformation amount of the shapelet (S202), and adds the estimated deformation amount to the trained reference shapelet to generate a shapelet corresponding to the value (S203).

The feature calculator 13 calculates a feature of the acquired testing time series data on the basis of the shapelet generated by the shapelet adjuster 17 (S204). Namely, the feature during testing is based on the shapelet adjusted by the shapelet adjuster 17 and the waveform of the time series data. Note that as described above, the distance between the two may also be treated as a feature, and in this case, the feature based on the reference shapelet after adjustment will be smaller than the feature of the reference shapelet before adjustment. By causing the feature to decrease through adjustment, the result of classification based on the feature becomes more accurate.

The classification device 14 inputs the calculated feature into the classifier to acquire a classification result (S205). Thereafter, the output device 19 outputs a processing result such as the classification result (S206), and the flow ends.

Note that the above classification process may also be performed by a different information processing apparatus 1 than the information processing apparatus 1 that performed the training process. For example, it is possible for the training process to be executed by a first information processing apparatus placed in the cloud, and the classification process to be executed by a second information processing apparatus placed in the same facility as a sensor or the like that acquires the time series data. In this case, the first information processing apparatus may also be referred to as the training apparatus, and the second information processing apparatus may also be referred to as the classification apparatus.

As above, when generating a classifier that classifies data into a class on the basis of time series data, the information processing apparatus 1 according to the present embodiment does not only generate a shapelet that serves as the basis for classification, but also generates a model that estimates the deformation of the shapelet in response to variations in an anticipated factor. Moreover, the model is used to deform the shapelet into a shape corresponding to the factor parameter. With this arrangement, the shapelet can be deformed easily and a drop in the classification performance can be suppressed, even in cases where the factor parameter may take a variety of values.

Furthermore, by presenting information related to shapelet deformation, the information processing apparatus 1 according to the present embodiment can provide assistance such as enhancing the persuasiveness of the basis of classification and contributing to a better understanding of the cause of an abnormality.

Note that at least a portion of the above embodiment may also be achieved by a special-purpose electronic circuit (that is, hardware) such as an integrated circuit (IC) in which components such as a processor and a memory are implemented. Moreover, at least a portion of the above embodiment may also be achieved by executing software (a program). For example, the processes according to the above embodiment are achievable by using a general-purpose computer apparatus as the base hardware and causing a processor such as a CPU mounted in the computer apparatus to execute a program.

For example, by causing a computer to read out special-purpose software stored in a computer-readable storage medium, the computer can function as an apparatus according to the above embodiment. The type of the storage medium is not particularly limited. Furthermore, the computer can function as an apparatus according to the above embodiment by causing the computer to install special-purpose software downloaded over a communication network. In this way, information processing expressed by software is carried concretely by using hardware resources.

Figure 12:
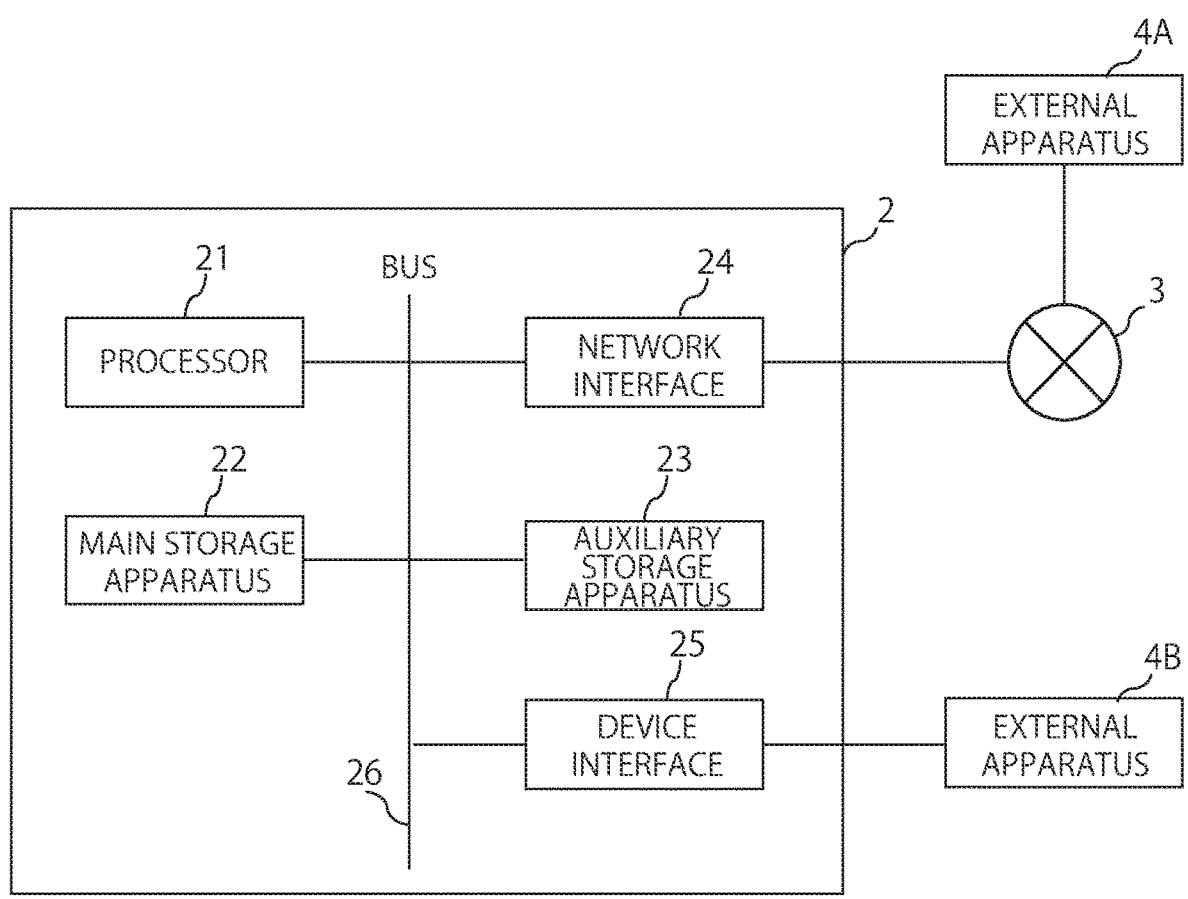
FIG. 12 is a block diagram illustrating an example of a hardware configuration according to an embodiment of the present invention.

FIG. 12 is a block diagram illustrating an example of a hardware configuration according to an embodiment of the present invention. The information processing apparatus 1 can be achieved as a computer apparatus 2 provided with a processor 21, a main storage apparatus 22, an auxiliary storage apparatus 23, a network interface 24, and a device interface 25 interconnected through a bus 26. The storage 11 is achievable by the main storage apparatus 22 or the auxiliary storage apparatus 23, and the components other than the storage 11, such as the feature calculator, are achievable by the processor 21.

Note that the computer apparatus 2 in FIG. 12 is provided with one of each component, but may also be provided with a plurality of the same component. Also, although FIG. 12 illustrates a single computer apparatus 2, software may be installed in a plurality of computer apparatuses, and the plurality of computer apparatuses may execute processes according to respectively different portions of the software.

The processor 21 is an electronic circuit including a computer control apparatus and computational apparatus. The processor 21 performs computational processing on the basis of data and programs inputted from sources such as each apparatus in the internal configuration of the computer apparatus 2, and outputs a computational result or a control signal to destinations such as each apparatus, Specifically, the processor 21 executes programs such as an operating system (OS) and applications of the computer apparatus 2, and controls each apparatus forming the computer apparatus 2. The processor 21 is not particularly limited insofar as the above processing can be performed.

The main storage apparatus 22 is a storage apparatus that stores information such as command to be executed by the processor 21 and various data, and the information stored in the main storage apparatus 22 is read out directly by the processor 21. The auxiliary storage apparatus 23 is a storage apparatus other than the main storage apparatus 22. Note that these storage apparatuses refer to any electronic component capable of storing electronic information, and may be memory or storage. Also, the memory may be either or both of volatile memory and non-volatile memory.

The network interface 24 is an interface for connecting to a communication network 3 in a wired or wireless configuration. An interface conforming to an existing communication standard may be used as the network interface 24, Through the network interface 24, information may be exchanged with an external apparatus 4A communicably connected over the communication network 3.

The device interface 25 is an interface such as USB that directly connects to an external apparatus 4B. The external apparatus 4B may be an external storage medium, or a storage apparatus such as a database.

The external apparatuses 4A and 4B may also be output apparatuses. For example, the output apparatuses may be a display apparatus for displaying images and an apparatus that outputs sound or the like. For example, the output apparatuses may be a liquid crystal display (LCD), a cathode ray tube (CRT), a plasma display panel (PDP), or a speaker, but are not limited to the above.

Note that the external apparatuses 4A and 4B may also be input apparatuses. The input apparatuses are provided with devices such as a keyboard, a mouse, and a touch panel, and supply information inputted through these devices to the computer apparatus 2. Signals from the input apparatuses are outputted to the processor 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
an adjuster configured to adjust a shape of a reference waveform pattern corresponding to time series data and used to classify the time series data, on a basis of a value of a factor parameter corresponding to the time series data; and
a feature calculator configured to calculate a feature of a waveform of the time series data on a basis of the shape of the reference waveform pattern after the adjustment, wherein
the reference waveform pattern before the adjustment is a shape that does not correspond to the value of the factor parameter, but the reference waveform pattern after the adjustment is a shape that corresponds to the value of the factor parameter.

2. The information processing apparatus according to claim 1, further comprising:
a classification device configured to acquire a classification result for the time series data by inputting the feature into a classifier.

3. The information processing apparatus according to claim 1, wherein
if the value of the factor parameter varies, the waveform of the time series data deforms,
the feature is based on a distance between the reference waveform pattern and the waveform of the time series data, and
the feature based on the reference waveform pattern after the adjustment is smaller than the feature based on the reference waveform pattern before the adjustment.

4. The information processing apparatus according to claim 1, further comprising:
an input device; and
an output device, wherein
the input device receives a specific value with respect to the factor parameter,
the adjuster executes the adjustment of the shape of the reference waveform pattern on a basis of the specific value, and
the output device outputs information related to the adjustment.

5. The information processing apparatus according to claim 1, further comprising:
an input device; and
an output device, wherein
the input device receives a transition range or a plurality of specific values of the value of the factor parameter,
the adjuster executes the adjustment of the shape of the reference waveform pattern on a basis of a plurality of values included in the transition range or the plurality of specific values, and
the output device outputs information related to each position of a plot forming the reference waveform pattern after executing the adjustment.

6. An information processing apparatus comprising:
an adjuster configured to adjust a shape of a reference waveform pattern corresponding to time series data and used to classify the time series data, on a basis of a value of a factor parameter corresponding to the time series data; and
a feature calculator configured to calculate a feature of a waveform of the time series data on a basis of the shape of the reference waveform pattern after the adjustment, wherein
the adjuster executes the adjustment on a basis of an output of an estimation model obtained by inputting the value of the factor parameter into the estimation model, and
the estimation model estimates a deformation amount of the shape of the reference waveform pattern before and after the adjustment.

7. The information processing apparatus according to claim 6, wherein
the deformation amount is expressed as a distance that each plot forming the reference waveform pattern has moved due to the adjustment.

8. An information processing apparatus comprising:
an adjuster configured to adjust a shape of a reference waveform pattern corresponding to time series data and used to classify the time series data, on a basis of a value of a factor parameter corresponding to the time series data;
a feature calculator configured to calculate a feature of a waveform of the time series data on a basis of the shape of the reference waveform pattern after the adjustment;
a classification device configured to acquire a classification result for the time series data by inputting the feature into a classifier;
a classifier updater; and
a reference waveform pattern updater,
wherein
the feature calculator calculates a training feature related to training time series data in which a correct class into which the data should be classified is indicated, on a basis of the training time series data and a training reference waveform pattern corresponding to the training time series data,
the classification device acquires a training classification result for the training time series data by inputting the training feature into the classifier,
the classifier updater updates a value of a parameter of the classifier on a basis of the training classification result and the correct class, and
the reference waveform pattern updater updates the training reference waveform pattern on a basis of the training classification result and the correct class, and uses the updated training reference waveform pattern to generate the reference waveform pattern.

9. The information processing apparatus according to claim 6, further comprising:
an input device; and
an output device, wherein
the input device receives a specification related to the estimation model,
the adjuster executes the adjustment of the shape of the reference waveform pattern on a basis of the specified estimation model, and
the output device outputs information related to the adjustment.

10. The information processing apparatus according to claim 8, wherein
the updating performed by the classifier updater and the reference waveform pattern updater is based on gradient descent.

11. An information processing apparatus comprising:
an adjuster configured to adjust a shape of a reference waveform pattern corresponding to time series data and used to classify the time series data, on a basis of a value of a factor parameter corresponding to the time series data;
a feature calculator configured to calculate a feature of a waveform of the time series data on a basis of the shape of the reference waveform pattern after the adjustment;
a classification device configured to acquire a classification result for the time series data by inputting the feature into a classifier;
a classifier updater;
a reference waveform pattern updater; and
an estimation model updater,
wherein
the feature calculator calculates a training feature related to training time series data in which a correct class into which the data should be classified is indicated, on a basis of the training time series data and a training reference waveform pattern corresponding to the training time series data,
the classification device acquires a training classification result for the training time series data by inputting the training feature into the classifier,
the classifier updater updates a value of a parameter of the classifier on a basis of the training classification result and the correct class, and
the reference waveform pattern updater updates the training reference waveform pattern on a basis of the training classification result and the correct class, and uses the updated training reference waveform pattern to generate the reference waveform pattern,
the adjuster adjusts a shape of the training reference waveform pattern used to calculate the training feature on a basis of an output of an estimation model obtained by inputting the value of the factor parameter corresponding to the training time series data into the estimation model, the estimation model estimating a deformation amount of the shape of the reference waveform pattern before and after the adjustment, and
the estimation model updater updates a parameter of the estimation model such that the shape of the adjusted training reference waveform pattern approaches the shape of the updated training reference waveform pattern.

12. An information processing method comprising:
adjusting a shape of a reference waveform pattern corresponding to time series data and used to classify the time series data, on a basis of a value of a factor parameter corresponding to the time series data; and
calculating a feature of a waveform of the time series data on a basis of the shape of the reference waveform pattern after the adjustment,
wherein
the reference waveform pattern before the adjustment is a shape that does not correspond to the value of the factor parameter, but the reference waveform pattern after the adjustment is a shape that corresponds to the value of the factor parameter.

13. A non-transitory storage medium storing a program executed by a computer, the program comprising:
adjusting a shape of a reference waveform pattern corresponding to time series data and used to classify the time series data, on a basis of a value of a factor parameter corresponding to the time series data; and
calculating a feature of a waveform of the time series data on a basis of the shape of the reference waveform pattern after the adjustment,
wherein
the reference waveform pattern before the adjustment is a shape that does not correspond to the value of the factor parameter, but the reference waveform pattern after the adjustment is a shape that corresponds to the value of the factor parameter.

14. An information processing method comprising:
  adjusting a shape of a reference waveform pattern corresponding to time series data and used to classify the time series data, on a basis of a value of a factor parameter corresponding to the time series data;
  calculating a feature of a waveform of the time series data on a basis of the shape of the reference waveform pattern after the adjustment; and
  executing the adjustment on a basis of an output of an estimation model obtained by inputting the value of the factor parameter into the estimation model,
  wherein the estimation model estimates a deformation amount of the shape of the reference waveform pattern before and after the adjustment.

15. A non-transitory storage medium storing a program executed by a computer, the program comprising:
  adjusting a shape of a reference waveform pattern corresponding to time series data and used to classify the time series data, on a basis of a value of a factor parameter corresponding to the time series data;
  calculating a feature of a waveform of the time series data on a basis of the shape of the reference waveform pattern after the adjustment; and
  executing the adjustment on a basis of an output of an estimation model obtained by inputting the value of the factor parameter into the estimation model,
  wherein the estimation model estimates a deformation amount of the shape of the reference waveform pattern before and after the adjustment.

\* \* \* \* \*